UNITED STATES PATENT OFFICE.

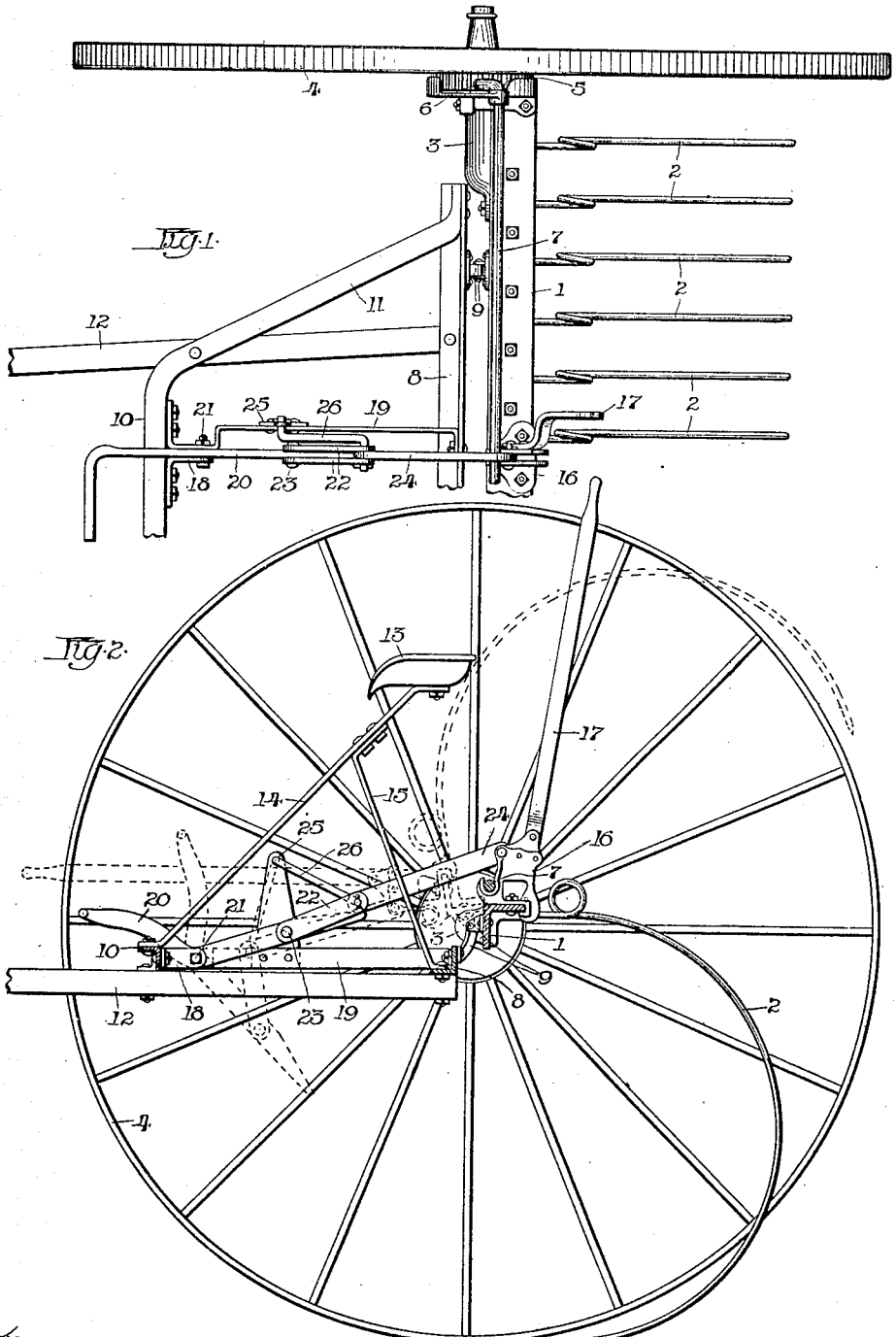

CHARLES PEARSON, OF CHICAGO, ILLINOIS, ASSIGNOR TO INTERNATIONAL HARVESTER COMPANY, A CORPORATION OF NEW JERSEY.

HAY-RAKE.

No. 913,971.     Specification of Letters Patent.     Patented March 2, 1909.

Application filed July 22, 1908. Serial No. 444,722.

*To all whom it may concern:*

Be it known that I, CHARLES PEARSON, a citizen of the United States, residing at Chicago, in the county of Cook and State of Illinois, have invented certain new and useful Improvements in Hay-Rakes, of which the following is a specification.

My invention relates to hay rakes that may be applied to either a self-dump or a hand-dump rake, its object being to provide an improved toggle connection between the draft frame of the machine and the rocking rake head, whereby the latter may be securely held in operative position and may be retained in inoperative position by means of pressure in a forward direction of a foot lever forming part of the toggle connection.

I attain these objects by means of the mechanism illustrated in the accompanying drawing, in which—

Figure 1 represents a top plan view of a part of a hay rake having my invention forming a part thereof. Fig. 2 is an end elevation of Fig. 1.

The same reference characters designate like parts throughout the several views.

Referring to the drawings, 1 represents a rake head, 2 teeth connected therewith, 3 a stub axle secured to the head and having a carrying wheel 4 journaled thereon, the hub of the wheel being provided with a common form of toothed ratchet 5 adapted to engage with a pawl 6 forming part of a rock shaft 7 mounted in bearings upon the rake head and operative to dump the rake in a common way.

8 designates a draft frame bar arranged parallel with the rake head and operatively connected therewith by means of hinged joints, as represented by numeral 9. 10 is another member of the draft frame arranged forward of member 8, substantially parallel therewith and having rearwardly diverging members, designated by the numeral 11, secured thereto. 12 represents one of the thills secured to said draft frame, and 13 represents the seat supported by the spring member 14 and brace member 15, that are also secured to the draft frame. A bracket 16 is secured to the rake head, and 17 is a hand lever secured thereto.

Secured to the draft member 10 is an L-shaped bracket member 18 having one end projecting rearward, and 19 designates a bar having its opposite end member secured to draft members 8 and 10, and having its forward portion parallel with the rearward portion of bracket 18, the two portions being spaced apart in a manner to receive a foot lever 20 between them, the foot lever being pivotally mounted upon cross pin 21 received by openings in the bracket and bar. The foot lever extends rearward from its pivot, and 22 represents links arranged upon opposite sides thereof and having their forward ends pivotally connected therewith by means of a cross pin 23, and their rearward ends pivotally connected with the forward end of a link 24, the rear end of the link 24 being pivotally connected with bracket 16. The foot lever extends rearward from its pivotal connection with the links 22 and is designed to engage with the forward end of link 24 in a manner to limit the forward swing of the parts, as shown in full lines. The bar 19 is given a bend in a lateral direction in rear of pivot pin 21, and its body portion extends rearward parallel with the toggle mechanism. A bracket 25 is secured at its lower end to the bar 19 intermediate its ends, and 26 represents a link having its upper end pivotally connected with the upper end of said bracket, and its opposite end pivotally connected with the toggle mechanism, preferably coaxial with the connection between the rear ends of links 22 and the forward end of link 24, the function of link 26 being to control the movement of the toggle mechanism in a manner whereby pressure upon the foot lever will retain said mechanism in position to hold the rake teeth in an elevated position, as shown by dotted lines in Fig. 2, wherein the pivotal connection between the link 26 and the toggle mechanism is forward of a line drawn through the pivotal connection of link 26 with the foot lever and the pivotal connection of link 26 with bracket.

When the foot lever is released from pressure the rake head is thrown rearward, carrying the toggle mechanism with it, and the parts thereof swing upon their pivotal connections when the point of connection between link 26 and the toggle mechanism passes rearward of a line drawn through the point of connection of the link with the bracket 25 and the point of connection of the links 22 with the foot lever. Pressure upon said foot lever will operate to force the head rearward in its rocking movement and thereby cause the teeth to move to their raking position.

What I claim as being my invention, and desire to secure by Letters Patent, is:

1. In a hay rake, the combination of a rocking rake head, a draft frame pivotally connected therewith, a toggle mechanism pivotally connecting said draft frame and said head, a toggle controlling mechanism including a link having one end pivotally connected with a fixed part of said draft frame and its opposite end pivotally connected with said toggle mechanism.

2. In a hay rake, the combination of a rocking rake head, a draft frame pivotally connected therewith, a toggle mechanism having its opposite ends pivotally connected with said draft frame and said head and adapted to retain said head in operative or inoperative position, a toggle controlling mechanism including a link having its lower end pivotally connected with said toggle mechanism intermediate its connection with said rake head and draft frame and its upper end pivotally connected with a fixed part of said draft frame.

3. In a hay rake, the combination of a rocking rake head, a draft frame pivotally connected therewith, a foot lever pivotally mounted upon said draft frame and extending forward and rearward of its pivotal connection, a bracket secured to said rake head, a toggle link having its rear end pivotally connected with said bracket, a link connection between the forward end of said toggle link and the rearward extension of said foot lever, a vertically arranged bracket secured to said draft frame, and a link pivotally connected with the upper end of said bracket and with the forward end of said toggle link.

4. In a hay rake, the combination of a rocking rake head, a draft frame pivotally connected therewith, a foot lever pivotally mounted upon said draft frame and extending forward and rearward of its pivotal connection, a bracket secured to said rake head, a toggle link having its rear end pivotally connected with said bracket, a link connection between the forward end of said toggle link and the rearward extension of said foot lever, a vertically arranged bracket secured to said draft frame, a link having one end pivotally connected with the upper end of said bracket and its opposite end pivotally connected with the forward end of said toggle link coaxial with the pivotal connection of the latter with the links connecting it to the foot lever.

5. In a hay rake, the combination of a rocking rake head, a draft frame pivotally connected therewith, said draft frame including front and rear members arranged parallel with said head, a frame bar arranged at right angles with said front and rear members and having its opposite ends secured thereto, a bracket secured to said head, a toggle link having its rear end pivotally connected with said bracket, a foot lever pivotally mounted in the forward end of said frame bar and extending forward and rearward of its pivotal connection, a link connection between the forward end of said toggle link and the rearward extension of said foot lever, a vertically arranged bracket secured to said frame bar intermediate its ends, a link having one end pivotally connected with the upper end of said bracket and its opposite end pivotally connected with the forward end of said toggle link coaxial with the pivotal connection of the latter with the links connecting it with said foot lever, the rearward extension of said foot lever engaging with the forward end of said toggle link when the parts have reached a predetermined limit of movement in one direction.

6. In a hay rake, the combination of a rocking rake head, a draft frame pivotally connected therewith, a toggle connection between said draft frame and said head, said toggle connection including a foot lever pivotally mounted upon the draft frame and having a rearwardly extending arm, a bar having its rear end pivotally connected with said head, an intermediate toggle member connecting the front end of said bar with the rear end of said arm, a link having one end pivotally connected with a fixed part of the draft frame and its opposite end with said intermediate toggle member in a manner to control the path of movement thereof.

CHARLES PEARSON.

Witnesses:
RAY PATTISON,
GUS. HAMMER.